(12) United States Patent
Moon et al.

(10) Patent No.: US 9,335,442 B1
(45) Date of Patent: *May 10, 2016

(54) POLARIZING FILM AND DISPLAY DEVICE INCLUDING THE POLARIZING FILM (71) Applicants: SAMSUNG ELECTRONICS CO., LTD, Suwon-si, Gyeonggi-do (KR); SAMSUNG SDI CO., LTD, Yongin-si, Gyeonggi-do (KR)

(72) Inventors: Deuk Kyu Moon, Seoul (KR); Ha Na Kim, Yongin-si (KR); Sang Ho Park, Anyang-si (KR); Yong Joo Lee, Suwon-si (KR); Jong Hoon Won, Yongin-si (KR); Myung Sup Jung, Seongnam-si (KR)

(73) Assignees: SAMSUNG ELECTRONICS CO., LTD. (KR); SAMSUNG SDI CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/709,969

(22) Filed: May 12, 2015

(30) Foreign Application Priority Data

Dec. 5, 2014 (KR) .......................... 10-2014-0174444

(51) Int. Cl.
| | |
|---|---|
| *F21V 9/14* | (2006.01) |
| *G02B 5/30* | (2006.01) |
| *G02C 7/12* | (2006.01) |
| *G02B 1/08* | (2006.01) |
| *B29D 7/01* | (2006.01) |
| *G02F 1/1335* | (2006.01) |

(52) U.S. Cl.
CPC ................ *G02B 1/08* (2013.01); *G02B 5/3033* (2013.01)

(58) Field of Classification Search
USPC ............ 252/585; 264/1.34; 349/96; 428/220
See application file for complete search history.

(56) References Cited

U.S. PATENT DOCUMENTS

| | | | |
|---|---|---|---|
| 5,751,389 A | 5/1998 | Andreatta et al. | |
| 6,133,973 A | 10/2000 | Andreatta et al. | |
| 2013/0303677 A1* | 11/2013 | Kim et al. | ............ G02B 5/3016 524/508 |
| 2014/0124714 A1 | 5/2014 | Lee et al. | |
| 2014/0131643 A1 | 5/2014 | Lee et al. | |

FOREIGN PATENT DOCUMENTS

| | | |
|---|---|---|
| KR | 19977005769 A | 10/1997 |
| KR | 1020140059145 A | 5/2014 |
| WO | 2011157614 A1 | 12/2011 |

* cited by examiner

*Primary Examiner* — Bijan Ahvazi
(74) *Attorney, Agent, or Firm* — Cantor Colburn LLP (57) ABSTRACT

A polarizing film including a melt-elongated film including a polyolefin and a dichroic dye represented by Chemical Formula 1:

Chemical Formula 1

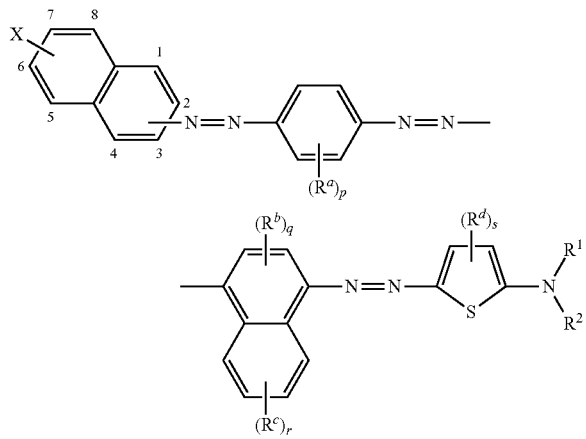

wherein in Chemical Formula 1, each group and variable is the same as defined in the detailed description.

25 Claims, 5 Drawing Sheets

POLARIZING FILM AND DISPLAY DEVICE INCLUDING THE POLARIZING FILM

CROSS-REFERENCE TO RELATED APPLICATION

This application claims priority to Korean Patent Application No. 10-2014-0174444 filed in the Korean Intellectual Property Office on Dec. 5, 2014, and all the benefits accruing therefrom under 35 U.S.C. §119, the content of which is incorporated herein in its entirety by reference.

BACKGROUND

1. Field

A polarizing film and a display device including the polarizing film are disclosed.

2. Description of the Related Art

A display device such as a liquid crystal display (LCD) and an organic light emitting diode (OLED) includes a polarizing plate attached to the outside of the display panel. The polarizing plate only transmits light of a specific wavelength and absorbs or reflects light of any other wavelength, thereby controlling the direction of incident light on the display panel or light emitted from the display panel.

The polarizing plate generally includes a polarizer and a protective layer for the polarizer. The polarizer may be formed of, for example, polyvinyl alcohol (PVA), and the protective layer may be formed of, for example, triacetyl cellulose (TAC).

However, the process of fabrication of the polarizing plate including the polarizer and the protective layer is not only complicated and expensive, but also results in a production of a thick polarizing plate which leads to an increased thickness of a display device. Accordingly, there remains a need in a polarizing film that does not require a protective layer.

SUMMARY

An embodiment provides a polarizing film having excellent polarization characteristics and a high absorption degree in a long wavelength region.

Another embodiment provides a display device including the polarizing film.

Yet another embodiment provides a composition for a polarizing film.

According to an embodiment, a polarizing film including a melt-elongated film including a polyolefin and a dichroic dye represented by Chemical Formula 1 is provided.

$R^a$ to $R^d$ are hydrogen, a halogen, a substituted or unsubstituted C1 to C5 alkyl group, or a substituted or unsubstituted C1 to C5 alkoxy group, p, q, r, and s are each independently an integer of 0 to 3, $R^1$ and $R^2$ are each independently hydrogen or a substituted or unsubstituted C1 to C10 alkyl group, which are optionally linked to each other to form a ring, and a first azo group is attached at position 1, 2, or 3 of the terminal naphthalene group.

X may be a substituted or unsubstituted C8 to C20 alkyl group or a substituted or unsubstituted C8 to C20 alkoxy group.

When the first azo group is attached at position 2 of the terminal naphthalene group, X may be attached at position 6 of the terminal naphthalene group, and when the first azo group is attached at position 3 of the terminal naphthalene group, X may be attached at position 7 of the terminal naphthalene group.

The dichroic dye may have an aspect ratio of about 2.5 to about 5.

A solubility parameter difference between the polyolefin and the dichroic dye may range from about 7.4 to about 10.

The dichroic dye may have a decomposition temperature of greater than or equal to about 245° C.

The polyolefin may have a melting point of less than or equal to about 300° C.

The polyolefin may include polyethylene, polypropylene, a copolymer thereof, or a combination thereof.

The polyolefin may have a melt flow index of about 1 gram per 10 minutes to about 15 grams per 10 minutes.

The polyolefin may be a mixture of polypropylene and a copolymer of polyethylene and polypropylene, polypropylene may have a melt flow index of about 0.1 grams per 10 minutes to about 5 grams per 10 minutes, and the polyethylene-polypropylene copolymer may have a melt flow index of about 5 grams per 10 minutes to about 15 grams per 10 minutes.

The polyolefin may be a mixture of polypropylene and a copolymer of polyethylene and polypropylene, and a content of polyethylene in the copolymer of polyethylene and polypropylene may be about 1 to about 50 percent by weight.

A weight ratio of the polypropylene and the polyethylene-polypropylene copolymer in the polyolefin may be about 1:9 to about 9:1.

An amount of the dichroic dye in the polarizing film may be about 0.01 to about 5 parts by weight based on 100 parts by weight of the polyolefin.

Chemical Formula 1

In Chemical Formula 1,

X is a substituted or unsubstituted C3 to C20 alkyl group or a substituted or unsubstituted C3 to C20 alkoxy group, which is attached at position 6 or 7 of a terminal naphthalene group, An amount of the dichroic dye in the polarizing film may be about 0.05 to about 1 part by weight based on 100 parts by weight of the polyolefin.

The polarizing film may have a dichroic ratio of about 3 to about 10 in a wavelength region of greater than or equal to about 600 nanometers.

The dichroic dye may be dispersed in the polyolefin, and the polyolefin may be elongated in a uniaxial direction by about 400 to about 1,000%.

According to another embodiment, a display device including the polarizing film is provided.

According to yet another embodiment, a composition for a polarizing film including a polyolefin and a dichroic dye represented by Chemical Formula 1 is provided.

Chemical Formula 1

In Chemical Formula 1,

X is a substituted or unsubstituted C3 to C20 alkyl group or a substituted or unsubstituted C3 to C20 alkoxy group, which is attached at position 6 or 7 of a terminal naphthalene group, $R^a$ to $R^d$ are hydrogen, a halogen, a substituted or unsubstituted C1 to C5 alkyl group, or a substituted or unsubstituted C1 to C5 alkoxy group, p, q, r, and s are each independently an integer of 0 to 3, $R^1$ and $R^2$ are each independently hydrogen or a substituted or unsubstituted C1 to C10 alkyl group, which are optionally linked to each other to form a ring, and a first azo group is attached at position 1, 2, or 3 of the terminal naphthalene group.

The composition for a polarizing film may have a solid content of greater than or equal to about 90 percent by weight.

The composition for a polarizing film may not include a solvent.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Exemplary embodiments will hereinafter be described in detail, and may be easily performed by those who have common knowledge in the related art. However, this disclosure may be embodied in many different forms and is not construed as limited to the exemplary embodiments set forth herein; rather, these embodiments are provided so that this disclosure will fully convey the scope of the disclosure to those skilled in the art. Thus, in some exemplary embodiments, well known technologies are not specifically explained to avoid ambiguous understanding of the present inventive concept. Accordingly, the exemplary embodiments are merely described below, by referring to the figures, to explain aspects of the present inventive concept. Expressions such as "at least one of," when preceding a list of elements, modify the entire list of elements and do not modify the individual elements of the list. Unless otherwise defined, all terms used in the specification (including technical and scientific terms) may be used with meanings commonly understood by a person having ordinary knowledge in the art to which this invention belongs. Further, unless explicitly defined to the contrary, the terms defined in a generally-used dictionary should be interpreted as having a meaning that is consistent with their meaning in the context of the relevant art and the present disclosure, and are not ideally or excessively interpreted. In addition, unless explicitly described to the contrary, the word "comprise" and variations such as "comprises" or "comprising", and the word "include" and variations such as "includes" or "including", when used in this specification, specify the presence of stated features, regions, integers, steps, operations, elements, and/or components, but do not preclude the presence or addition of one or more other features, regions, integers, steps, operations, elements, components, and/or groups thereof. Therefore, the above words will be understood to imply the inclusion of stated elements but not the exclusion of any other elements.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As stated above, unless specifically described to the contrary, a singular form includes a plural form.

In the drawings, the thickness of layers, films, panels, regions, etc., are exaggerated for clarity. Like reference numerals designate like elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

As used herein, when a definition is not otherwise provided, the term 'substituted' refers to a group substituted with at least one substituent selected from a C1 to C10 alkyl group, a C2 to C20 alkenyl group, a C2 to C20 alkynyl group, and a combination thereof, in place of at least one hydrogen of a functional group or a compound.

As used herein, when a definition is not otherwise provided, the term "alkyl group" may refer to a group derived from a straight or branched chain saturated aliphatic hydrocarbon having the specified number of carbon atoms and having a valence of at least one.

As used herein, when a definition is not otherwise provided, the term "alkoxy group" may refer to "alkyl-O—", wherein the term "alkyl" has the same meaning as described above.

As used herein, when a definition is not otherwise provided, the term "alkenyl group" may refer to a straight or branched chain, monovalent hydrocarbon group having at least one carbon-carbon double bond.

As used herein, when a definition is not otherwise provided, the term "alkynyl group" may refer to a straight or branched chain, monovalent hydrocarbon group having at least one carbon-carbon triple bond.

Hereinafter, referring to FIG. 1, a polarizing film according to an embodiment is described.

Figure 1:
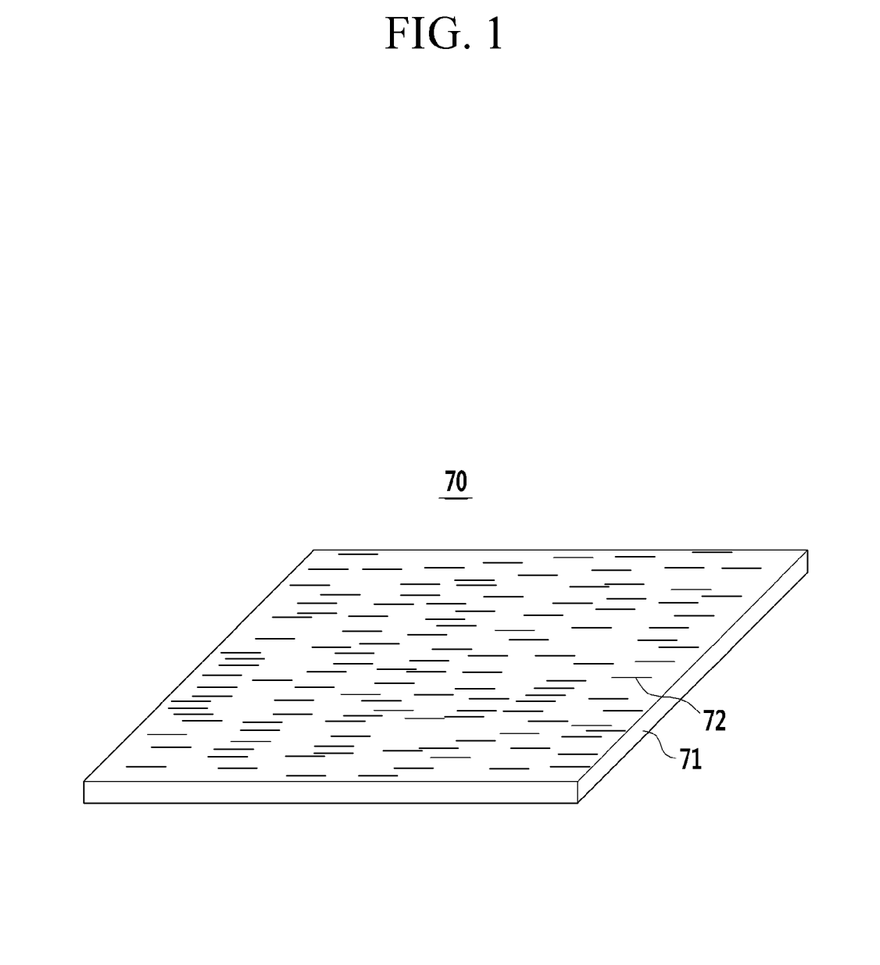
FIG. 1 is schematic view of a polarizing film according to an embodiment.

FIG. 1 is schematic view of a polarizing film according to an embodiment.

Referring to FIG. 1, a polarizing film 70 according to an embodiment includes a polyolefin 71 and a dichroic dye 72.

The polarizing film 70 includes a melt-elongated film including a polyolefin 71 and a dichroic dye 72 represented by the following Chemical Formula 1.

Chemical Formula 1

In Chemical Formula 1,

X is a substituted or unsubstituted C3 to C20 alkyl group or a substituted or unsubstituted C3 to C20 alkoxy group, which is attached (linked) at position 6 or 7 of a terminal (leftmost) naphthalene group, $R^a$ to $R^d$ is hydrogen, a halogen (F, Cl, Br, or I), a substituted or unsubstituted C1 to C5 alkyl group, or a substituted or unsubstituted C1 to C5 alkoxy group, p, q, r, and s are each independently an integer of 0 to 3, $R^1$ and $R^2$ are each independently hydrogen or a substituted or unsubstituted C1 to C10 alkyl group, which are optionally linked to each other to form a ring, and a first (leftmost) azo group is attached at position 1, 2, or 3 of the terminal naphthalene group.

For example, X may be a substituted or unsubstituted C3 to C20 alkyl group or a substituted or unsubstituted C3 to C20 alkoxy group, and for another example, X may be a substituted or unsubstituted C8 to C20 alkyl group or a substituted or unsubstituted C8 to C20 alkoxy group. Group X adjusts a solubility parameter of the dichroic dye and may increase compatibility of the dichroic dye with a polyolefin.

When the first azo group is attached at position 1, 2, or 3 of the terminal naphthalene group and X is attached at position 6 or 7 of the terminal naphthalene group, linearity of these substituents in the molecule represented by Chemical Formula 1 is maintained, an aspect ratio of the dichroic dye is controlled in the range of about 2.5 to about 5, an absorption degree of the dichroic dye in a long wavelength is increased to a value of greater than or equal to 600 nanometers (nm), thus increasing a dichroic ration of the polarizing film including the dichroic dye.

For example, when the first azo group is attached at position 2 of the terminal naphthalene group, group X may be attached at position 6 of the terminal naphthalene group, and when the first azo group is attached at position 3 of the terminal naphthalene group, group X may be attached at position 7 of the terminal naphthalene group. When the first azo group and group X are attached at the same position as above in the center of the naphthalene group, light absorption of the dichroic dye in a wavelength region of greater than or equal to about 600 nm may be improved by adjusting the aspect ratio of the dichroic dye in a range of about 2.5 to about 5, thus obtaining a dichroic ratio suitable for a polarizing film in a long wavelength region of greater than or equal to about 600 nm.

The alkyl group and the alkoxy group may be branched or linear, and in an embodiment, may desirably be linear.

In Chemical Formula 1, when p, q, r, and s are each an integer of 2 or 3, each of $R^a$ to $R^d$ may be the same or different. The $R^a$ to $R^d$ may be a halogen (F, Cl, Br, or I), a substituted or unsubstituted C1 to C5 alkyl group, or a substituted or unsubstituted C1 to C5 alkoxy group, and may be a substituent at the ortho position the naphthalene group to the azo groups.

In Chemical Formula 1, a naphthalene group present between the second (central) azo group and the third (rightmost) azo group helps the dichroic dye effectively absorb light in a long wavelength region of greater than or equal to about 600 nm. In addition, the naphthalene group is connected at a 1,4-position and helps the dichroic dye maintain an aspect ratio in a range of about 2.5 to about 5.

In other words, a first (leftmost) naphthalene group, a phenylene group, a second (rightmost) naphthalene group, a thiophene group, and an amine group (—$NR^1R^2$) linked to a particular position are consecutively present, and may provide a structure capable of effectively absorbing light in a long wavelength region. The first and second naphthalene groups may be arranged in a particular direction, and thus the molecule represented by Chemical Formula 1 may be designed to have a desirable structure for absorbing light in a long wavelength region.

Examples of the dichroic dye 72 may be compounds represented by the following Chemical Formulae 1-1 to 1-3.

Chemical Formula 1-1

Chemical Formula 1-2

Chemical Formula 1-3

The dichroic dye 72 represented by Chemical Formulae 1-1 to 1-3 may have an aspect ratio ranging from about 2.5 to about 5.

The solubility parameter difference between the dichroic dye 72 and the polyolefin 71 may range from about 7.4 to about 10, for example from about 8 to about 10. The solubility parameter indicates an interaction degree to which two or more compounds interact. The smaller solubility parameter difference the compounds have, the larger interaction they have, while the larger solubility parameter difference the compounds have, the smaller interaction they have. When the solubility parameter of the dichroic dye 72 with the polyolefin 71 is adjusted to be greater than or equal to about 7.4, their compatibility may be somewhat deteriorated, but this deteriorated compatibility may be compensated by adjusting the aspect ratio of the dichroic dye 72.

The solubility parameter of the polyolefin 71 may be, for example, about 15 to about 18. Accordingly, when the solubility parameter of the polyolefin is within the range, the dichroic dye may, for example, have a solubility parameter of greater than or equal to about 23.

The dichroic dye 72 may have a decomposition temperature of greater than or equal to about 245° C., for example about 245° C. to about 400° C. Herein, the decomposition temperature indicates a temperature at which the weight of the dichroic dye decreases by about 5% relative to its initial weight. The dichroic dye having a decomposition temperature within the above ranges may be desirable for a melt-elongation process.

The aspect ratio of the dichroic dye 72 may be from about 2.5 to about 5. When the dichroic dye 7 has the above aspect ratio, the absorption degree of the dichroic dye in a long wavelength region of greater than or equal to about 600 nm may be improved, and thus, the dichroic ratio of a polarizing film including the dichroic dye may be increased.

The polyolefin 71 may have a melting point ($T_m$) of less than or equal to about 300° C., for example about 150° C. to about 300° C.

The polyolefin 71 may be, for example, a mixture of two or more selected from polyethylene (PE), polypropylene (PP), and a polyethylene-polypropylene copolymer (PE-PP).

The polyolefin 71 may be, for example, a mixture of polypropylene (PP) and a polyethylene-polypropylene copolymer (PE-PP).

The polyolefin 71 may have a melt flow index (MFI) of about 1 gram per 10 minutes (1 g/10 min) to about 15 g/10 min, for example about 3 g/10 min to 11 g/10 min, and for another example about 5 g/10 min to 11 g/10 min. When the polyolefin has a melt flow index (MFI) within the range, the polyolefin may not only secure excellent light transmittance, due to the fact that crystals are not excessively formed in the polyolefin, but may also have appropriate viscosity for manufacturing a film, and thus have improved workability.

The polypropylene (PP) may have, for example, a melt flow index (MFI) of about 0.1 g/10 min to about 10 g/10 min, for another example about 3 g/10 min to about 9 g/10 min. Herein, the melt flow index (MFI) shows the amount of a polymer in a melt state flowing per 10 minutes, and relates to viscosity of the polymer in a melted state. In other words, when the melt flow index (MFI) is lower, the polymer has higher viscosity, and when the melt flow index (MFI) is higher, the polymer has lower viscosity. When the polypropylene (PP) has a melt flow index (MFI) within the above ranges, the properties of a final product as well as its workability may be effectively improved.

The polyethylene-polypropylene copolymer (PE-PP) may have a melt flow index (MFI) ranging from about 5 g/10 min to about 15 g/10 min, for example about 5 g/10 min to about 11 g/10 min. When the polyethylene-polypropylene copolymer (PE-PP) has a melt flow index (MFI) within the above ranges, the properties of a final product as well as its workability may be effectively improved.

The polyethylene-polypropylene copolymer (PE-PP) may include about 1 to about 50 percent by weight, for example about 1 percent by weight to about 25 percent by weight, of polyethylene based on the total amount of the copolymer. When the polyethylene-polypropylene copolymer (PE-PP) includes the polyethylene within the above ranges, phase separation of the polypropylene and the polyethylene-polypropylene copolymer (PE-PP) may be effectively prevented or suppressed. In addition, the polyethylene-polypropylene copolymer (PE-PP) may have improved an elongation rate, excellent light transmittance and alignment, and improved polarization characteristics.

The polyolefin 71 may include the polypropylene and the polyethylene-polypropylene copolymer in a weight ratio of about 1:9 to about 9:1, for example about 7:3 to about 3:7, for example about 4:6 to about 6:4, and for example about 5:5. When the polypropylene (PP) and the polyethylene-polypropylene copolymer (PE-PP) are included within the range, the crystallization of polypropylene may be prevented, and the copolymer may have excellent mechanical strength and significantly improved haze characteristics.

The polyolefin 71 may have haze ranging from less than or equal to about 5%, for example less than or equal to about 2%, and for another example about 0.5% to about 2%. When the polyolefin 71 has haze within the above ranges, its transmittance may be increased, and thus, its excellent optical properties may be secured.

The polyolefin 71 may have crystallinity of less than or equal to about 50%, for example about 30% to about 50%. When the polyolefin has crystallinity within the above ranges, the polyolefin may have lower haze and excellent optical properties.

The polyolefin 71 may be mixed with another polymer having similar physical optical properties. For example, the polyolefin may be mixed with a transparent polymer having a melting point of greater than or equal to about 130° C. and crystallinity of less than or equal to about 50%, for example, a polyester such as polyethylene terephthalate (PET), polybutylene terephthalate (PBT), polyethylene terephthalate glycol (PETG), and polyethylene naphthalate (PEN).

The polyolefin 71 is elongated in a uniaxial direction. The uniaxial direction may be the same as the length direction of the dichroic dye 72.

The dichroic dye 72 is dispersed into the polyolefin 71 and aligned in the elongation direction of the polyolefin 71. The dichroic dye 72 is a material that transmits one perpendicular polarization component of two perpendicular polarization components in a predetermined wavelength region.

The dichroic dye 72 may be included in an amount of about 0.01 to about 5 parts by weight, for example about 0.05 to about 1 part by weight based on 100 parts by weight of the polyolefin 71. When the dichroic dye is included within the above ranges, sufficient polarization characteristics may be obtained without deteriorating the transmittance of a polarizing film.

The polarizing film 70 may have a dichroic ratio of greater than or equal to about 3 to about 10 in a wavelength region of greater than or equal to about 600 nm. Herein, the dichroic ratio may be calculated by dividing plane polarization absorbance in a direction perpendicular to the axis of a polymer by polarization absorbance in a horizontal direction according to the following Equation 1.

$$DR = \text{Log}(1/T_\perp)/\text{Log}(1/T_\parallel) \qquad \text{Equation 1}$$

In Equation 1,

DR denotes a dichroic ratio of a polarizing film, $T_\parallel$ is light transmittance of light entering parallel to the transmissive axis of a polarizing film, and $T_\perp$ is light transmittance of light entering perpendicular to the transmissive axis of the polarizing film.

The dichroic ratio shows to what degree the dichroic dye 72 is arranged in one direction in the polarizing film 70. When the polarizing film 70 has a dichroic ratio within the range in a wavelength region of greater than or equal to about 600 nm, the dichroic dye 72 is arranged according to arrangement of polymer chains, improving polarization characteristics of the polarizing film 70.

The polarizing film 70 may have light transmittance of greater than or equal to about 30%, for example, ranging from about 30% to about 95% within the range. When the polarizing film 70 having light transmittance within the above ranges is applied to one side of a display device, light emitting from the display device may not be prevented.

The polarizing film 70 may be manufactured by melt-blending the composition for a polarizing film including the polyolefin and the dichroic dye and subsequently elongating the same. In an embodiment, the polarizing film 70 may be, for example, manufactured by a process including melt-blending the composition for a polarizing film including the polyolefin and the dichroic dye, to prepare a melt-blend, placing the melt-blend into a mold and pressing it into a sheet, and elongating the sheet in a uniaxial direction.

The polyolefin and the dichroic dye may be in a form of a solid such as a powder. The composition for a polarizing film may have, for example, a solid content of greater than or equal to about 90 percent by weight, and may not include, for example, a solvent.

The melt-blending of the composition for a polarization film may be performed at a temperature of less than or equal to about 300° C., for example, ranging from about 50 to about 300° C.

The sheet may be formed by placing the melt blend in the mold, and pressing it with a high pressure or discharging it in a chill roll through a T-die.

The elongation in a uniaxial direction may be performed at a temperature ranging from about 30 to about 200° C. at an elongation rate ranging from about 400% to about 1,000%. The elongation rate refers to a ratio of the length of the sheet after the elongation to the length of the sheet before the elongation, and reflects the elongation extent of the sheet after uniaxial elongation.

The polarizing film 70 may have a relatively small thickness of less than or equal to about 100 micrometers (μm), for example about 30 μm to about 95 μm. When the polarizing film 70 has a thickness within the above ranges, it may be significantly thinner than a polarizing plate requiring a protective layer such as triacetyl cellulose (TAC), and thus, may facilitate manufacture of a thin display device.

The polarizing film 70 may be applied to various display devices.

The display device may be a liquid crystal display (LCD).

Figure 2:
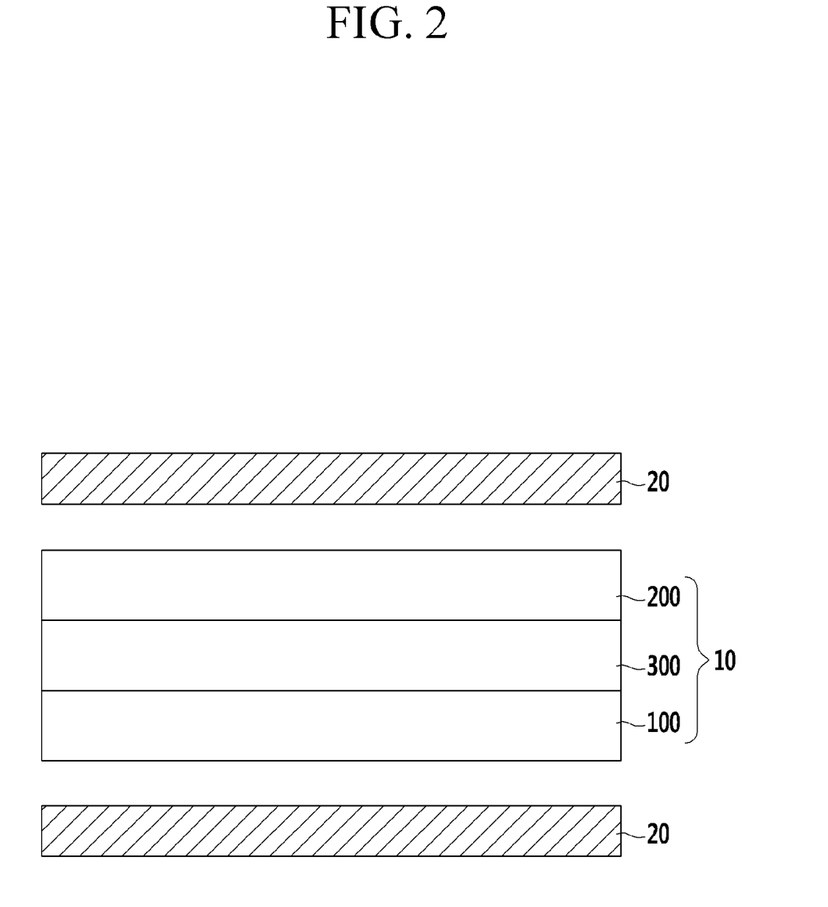
FIG. 2 is a cross-sectional view showing a liquid crystal display (LCD) according to an embodiment.

FIG. 2 is a cross-sectional view showing a liquid crystal display (LCD) according to an embodiment.

Referring to FIG. 2, the liquid crystal display (LCD) includes a liquid crystal display panel 10, and a polarizing film 20 disposed on both lower part and upper part of the liquid crystal display panel 10.

The liquid crystal display panel 10 may be a twist nematic (TN) mode panel, a patterned vertical alignment (PVA) mode panel, an in-plane switching (IPS) mode panel, an optically compensated bend (OCB) mode panel, and the like.

The liquid crystal display panel 10 includes a first display plate 100, a second display plate 200, and a liquid crystal layer 300 interposed between the first display plate 100 and the second display plate 200.

The first display plate 100 may include, for example, a thin film transistor (not shown) formed on a substrate (not shown), and a first electric field generating electrode (not shown) connected thereto. The second display plate 200 may include, for example, a color filter (not shown) formed on the substrate and a second electric field generating electrode (not shown). However, it is not limited thereto, and the color filter may be included in the first display plate 100, while both the first electric field generating electrode and the second electric field generating electrode may be disposed in the first display plate 100.

The liquid crystal layer 300 may include a plurality of liquid crystal molecules. The liquid crystal molecules may have positive or negative dielectric anisotropy. When the liquid crystal molecules have positive dielectric anisotropy, the long axes thereof may be aligned substantially parallel to the surface of the first display plate 100 and the second display plate 200 when an electric field is not applied, and may be aligned substantially perpendicular to the surface of the first display plate 100 and the second display plate 200 when an electric field is applied. On the contrary, when the liquid crystal molecules have negative dielectric anisotropy, the long axes thereof may be aligned substantially perpendicular to the surface of the first display plate 100 and the second display plate 200 when an electric field is not applied, and may be aligned substantially parallel to the surface of the first display plate 100 and the second display plate 200 when an electric field is applied.

The polarizing film 20 is disposed on the outside of the liquid crystal display panel 10. Although the polarizing film 20 is shown to be disposed on the upper part and lower part of the liquid crystal display panel 10 in FIG. 2, it may be formed on either the upper part or the lower part of the liquid crystal display panel 10.

The polarizing film 20 includes the polyolefin and the dichroic dye represented by Chemical Formula 1 as described above.

The display device may be an organic light emitting diode (OLED) display.

Figure 3:
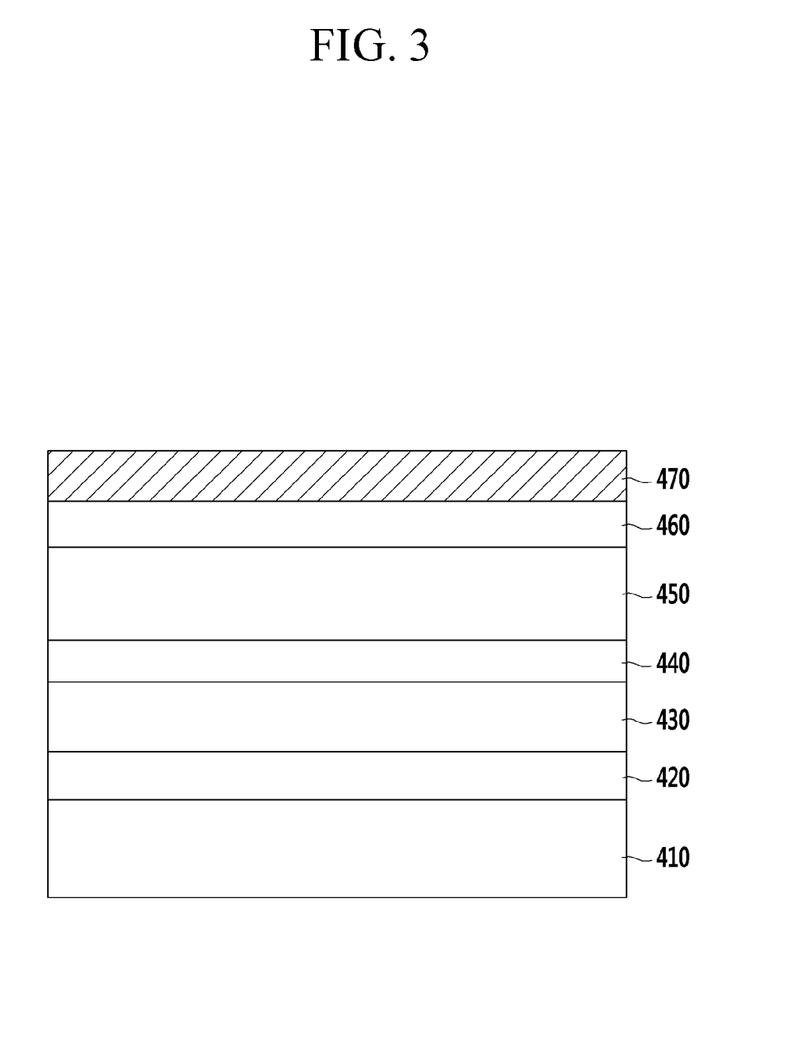
FIG. 3 is a cross-sectional view an organic light emitting diode (OLED) display according to an embodiment.

FIG. 3 is a cross-sectional view showing an organic light emitting diode (OLED) display according to an embodiment.

Referring to FIG. 3, an organic light emitting diode (OLED) display according to an embodiment includes a base substrate 410, a lower electrode 420, an organic emission layer 430, an upper electrode 440, an encapsulation substrate 450, a phase retardation film 460, and a polarizing film 470.

The base substrate 410 may be formed of glass or plastic.

One of the lower electrode 420 and the upper electrode 440 may be an anode, while the other one may be a cathode. The anode is an electrode where holes are injected. It is formed of a transparent conductive material having a high work function and externally transmitting entered light, for example, ITO or IZO. The cathode, an electrode where electrons are injected, is formed of a conducting material having a low work function and having no influence on an organic material, which is selected from, for example, aluminum (Al), calcium (Ca), and barium (Ba).

The organic emission layer 430 includes an organic material emitting light when a voltage is applied between the lower electrode 420 and the upper electrode 440.

An auxiliary layer (not shown) may be included between the lower electrode 420 and the organic emission layer 430 and between the upper electrode 440 and the organic emission layer 430. The auxiliary layer may include a hole transport layer for balancing electrons and holes, a hole injection layer (HIL), an electron injection layer (EIL), and an electron transport layer.

The encapsulation substrate 450 may be made of glass, metal, or a polymer. The lower electrode 420, the organic emission layer 430, and the upper electrode 440 are sealed to prevent moisture and/or oxygen from flowing in.

The phase retardation film 460 may circularly polarize light passing through the polarizing film 470 and may generate a phase difference, thus having an influence on reflection and absorption of the light. The phase retardation film 460 may be omitted depending on the case.

The polarizing film 470 may be disposed at a light-emitting side. For example, the polarizing film 470 may be disposed outside of the base substrate 410 in a bottom emission type in which light emits from the base substrate 410, and outside of the encapsulation substrate 450 in a top emission type in which light emits from the encapsulation substrate 450.

The polarizing film 470 may play a role of a light absorption layer absorbing external light, and thus may prevent display characteristic deterioration due to reflection of the external light.

Hereinafter, the present disclosure is illustrated in more detail with reference to examples. However, these examples are exemplary, and the present disclosure is not limited thereto.

Synthesis of Dichroic Dye

Synthesis Example 1

Synthesis of Compound Represented by Chemical Formula 1-1

1-1. Synthesis of Monoazo Compound 3 grams (g) (18.85 millimoles (mmol)) of 6-aminonaphthalene-2-ol is dissolved in 100 milliliters (mL) of acetone, and 4 g (20.7 mmol) of 1-bromooctane and 13.0 g (94.2 mmol) of potassium carbonate ($K_2CO_3$) are added thereto.

The reaction mixture is stirred under reflux at 60° C. for 24 hours, and cooled down to room temperature (25° C.). The obtained reaction mixture is concentrated, and purified by silica gel column chromatography (n-hexane:EtOAc=3:1 volume ratio), to give 4.5 g (16.6 mmol) of 6-octyloxynaphthalene-2-amine. The yield is 88%.

2.71 g (10 mmol) of the 6-octyloxynaphthalene-2-amine are dissolved in 100 mL of acetonitrile, and 2.5 mL of 12 normal (N) HCl, and a solution obtained by dissolving 0.7 g (10 mmol) of sodium nitrite (NaNO$_2$) in 10 mL of water is slowly added by drops. When the addition is complete, the reactant is agitated for 30 minutes while the temperature is maintained at 0° C. A solution obtained by dissolving 12 mmol of 3-methoxyaniline in 10 mL of acetonitrile is slowly added to the reaction mixture by drops, and the obtained mixture is agitated at 0° C. for one hour. The precipitated solid is filtered, made basic with potassium carbonate (K$_2$CO$_3$), and filtered again, thus obtaining a monoazo compound (3-methoxy-4-((6-(octyloxy)naphthalene-2-yl)diazenyl) aniline). The yield is 62%.

1-2. Synthesis of Diazo Compound 2.03 g (5 mmol) of the obtained 3-methoxy-4-(6-octyloxynaphthalene-2-yl)diazenyl aniline is dissolved in 100 mL of dimethyl formamide (DMF) and 25 mL of acetic acid (AcOH). 1.25 mL of 12 N HCl is added thereto, and the mixture is maintained at 0° C. A solution obtained by dissolving 350 mg (5 mmol) of sodium nitrite (NaNO$_2$) in 10 mL of water is slowly added by drops to the reaction mixture. When the addition is complete, the reactant is agitated for one hour while the temperature is maintained at 0° C. A solution obtained by dissolving 345 mg (5 mmol) of 1-aminonaphthalene 50 mL of methanol and 25 mL of dimethyl formamide (DMF) is slowly added to the reaction mixture by drops, and the resulting mixture is agitated at 0° C. for about one hour. The resultant is neutralized with a sodium hydroxide (NaOH) aqueous solution to finish the reaction, and the precipitated solid is filtered. The resultant is purified by silica gel column chromatography (n-hexane:EtOAc=3:1 volume ratio), obtaining a diazo compound. The yield is 68%.

1-3. Synthesis of Triazo Compound 3 mmol of the diazo compound is dissolved in 100 mL of dimethyl formamide (DMF) and 25 mL of acetic acid (AcOH), 0.75 mL of 12 N HCl is added thereto, and the mixture is maintained at 0° C. A solution obtained by dissolving 206 mg (3 mmol) of sodium nitrite (NaNO$_2$) in 2 mL of water is slowly added to the reaction mixture by drops. When the addition is complete, the reactant is agitated for one hour while the temperature is maintained at 0° C. A solution obtained by dissolving 500 mg (3 mmol) of 1-(thiene-2-yl)-piperidine and 6.5 g of sodium hydroxide (NaOH) in 100 mL of methanol is slowly added to the reaction mixture by drops, and the resulting mixture is agitated at 0° C. for one hour. The resultant is agitated at room temperature for one more hour and filtered. The obtained solid is washed with MeOH and purified by silica gel column chromatography (n-hexane: EtOAc=3:1 volume ratio), to give 1 g (1.36 mmol) of a dichroic dye represented by the following Chemical Formula 1-1. The yield is 45%.

Chemical Formula 1-1

The structure of the dichroic dye represented by the above Chemical Formula 1-1 is analyzed by $^1$H NMR.

$^1$H NMR (500 MHz. CDCl$_3$) δ (ppm): 0.89 (t, J=7.0 Hz, 3H, CH3), 1.29-1.38 (m, 8H, CH2×4), 1.46-1.52 (m, 2H, CH2), 1.67-1.71 (m, 2H, CH2), 1.73-1.78 (m, 4H, CH2×2), 1.82-1.86 (m, 2H, CH2), 3.50 (t, J=6.0 Hz, 4H, NCH2), 4.10 (t, J=6.5 Hz, 2H, OCH2), 4.16 (s, 3H, CH$_3$), 6.23 (d, J=5.0 Hz, 1H, ArH), 7.16 (s, 1H, ArH), 7.2 (dd, J$_1$=8.5 Hz, J$_2$=2.0 Hz, 1H, ArH), 7.63 (d, J=4.5 Hz, 1H, ArH), 7.65 (d, J=8.0 Hz, 1H, ArH), 7.68-7.71 (m, 1H, ArH), 7.74-7.78 (m, 3H, ArH), 7.88 (d, J=8.5 Hz, 1H, ArH), 7.89-7.92 (m, 1H, ArH), 8.01 (d, J=8.5 Hz, 1H, ArH), 8.09 (dd, J$_1$=8.5 Hz, J$_2$=1.5 Hz, 1H, ArH), 8.41 (s, 1H, ArH), 8.93 (d, J=8.0 Hz, 1H, ArH), 9.02 (d, J=8.0 Hz, 1H, ArH).

Synthesis Example 2

Synthesis of Compound Represented by Chemical Formula 1-2

A compound represented by Chemical Formula 1-2 is synthesized according to the same method as described in Synthesis Example 1, except for using m-toluidine instead of the 3-methoxyaniline. The yield is 60%.

Chemical Formula 1-2

The structure of the dichroic dye represented by the above Chemical Formula 1-2 is analyzed by $^1$H NMR.

$^1$H NMR (500 MHz. CDCl$_3$) δ (ppm): 0.89 (t, J=7.0 Hz, 3H, CH3), 1.29-1.39 (m, 8H, CH2×4), 1.47-1.50 (m, 2H, CH2), 1.67-1.71 (m, 2H, CH2), 1.73-1.78 (m, 4H, CH2×2), 1.84-1.87 (m, 2H, CH2), 2.87 (s, 3H, CH$_3$), 3.50 (t, J=6.0 Hz,

4H, NCH2), 4.10 (t, J=6.5 Hz, 2H, OCH2), 6.23 (d, J=5.0 Hz, 1H, ArH), 7.18 (s, 1H, ArH), 7.21 (dd, J$_1$=9.0 Hz, J$_2$=2.5 Hz, 1H, ArH), 7.63-7.65 (m, 1H, ArH), 7.67-7.71 (m, 1H, ArH), 7.77 (d, J=9.0 Hz, 1H, ArH), 7.88 (dd, J$_1$=8.5 Hz, J$_2$=2.0 Hz, 1H, ArH), 7.92 (d, J=8.5 Hz, 1H, ArH), 7.97 (dd, J$_1$=8.5 Hz, J$_2$=2.0 Hz, 1H, ArH), 7.99 (d, J=8.5 Hz, 1H, ArH), 8.02 (d, J=1.0 Hz, 1H, ArH), 8.06 (dd, J$_1$=8.5 Hz, J$_2$=1.5 Hz, 1H, ArH), 8.43 (s, 1H, ArH), 8.92 (d, J=8.0 Hz, 1H, ArH), 9.04 (d, J=8.0 Hz, 1H, ArH).

Synthesis Example 3

Synthesis of Compound Represented by Chemical Formula 1-3

A compound represented by Chemical Formula 1-3 is synthesized according to the same method as Synthesis Example 1, except for using 3-fluoroaniline instead of the 3-methoxyaniline. The yield is 54%.

Chemical Formula 1-3

The structure of the dichroic dye represented by the above Chemical Formula 1-3 is analyzed by $^1$H NMR.

$^1$H NMR (500 MHz. CDCl$_3$) δ (ppm): 0.89 (t, J=7.0 Hz, 3H, CH3), 1.29-1.38 (m, 8H, CH2×4), 1.46-1.51 (m, 2H, CH2), 1.67-1.71 (m, 2H, CH2), 1.73-1.78 (m, 4H, CH2×2), 1.83-1.86 (m, 2H, CH2), 3.50 (t, J=6.0 Hz, 4H, NCH2), 4.10 (t, J=6.5 Hz, 2H, OCH2), 6.23 (d, J=5.0 Hz, 1H, ArH), 7.17 (s, 1H, ArH), 7.22 (dd, J$_1$=8.5 Hz, J$_2$=2.0 Hz, 1H, ArH), 7.67 (d, J=4.5 Hz, 1H, ArH), 7.69 (d, J=8.0 Hz, 1H, ArH), 7.70-7.73 (m, 1H, ArH), 7.76-7.81 (m, 3H, ArH), 7.90 (d, J=8.5 Hz, 1H, ArH), 7.91-7.94 (m, 1H, ArH), 8.04 (d, J=8.5 Hz, 1H, ArH), 8.07 (dd, J$_1$=8.5 Hz, J$_2$=1.5 Hz, 1H, ArH), 8.42 (s, 1H, ArH), 8.92 (d, J=8.0 Hz, 1H, ArH), 9.03 (d, J=8.0 Hz, 1H, ArH).

Comparative Synthesis Example 3

Synthesis of Compound Represented by Chemical Formula 1-4

A compound represented by Chemical Formula 1-4 is synthesized according to the same method as Synthesis Example 1, except for using 4-octyloxyaniline instead of the 6-octyloxynaphthalene-2-amine. The yield is 70%.

The structure of the dichroic dye represented by the above Chemical Formula 1-4 is analyzed by $^1$H NMR.

$^1$H NMR (500 MHz. CDCl$_3$) δ (ppm): 0.89 (t, J=7.0 Hz, 3H, CH3), 1.29-1.36 (m, 8H, CH2×4), 1.45-1.48 (m, 2H, CH2), 1.69-1.72 (m, 2H, CH2), 1.73-1.78 (m, 4H, CH2×2), 1.79-1.82 (m, 2H, CH2), 3.50 (t, J=5.0 Hz, 4H, NCH2), 4.03 (t, J=6.5 Hz, 2H, OCH2), 4.15 (s, 3H, CH$_3$), 6.24 (d, J=4.5 Hz, 1H, ArH), 7.0 (dd, J$_1$=7.0 Hz, J$_2$=2.0 Hz, 2H, ArH), 7.63 (d, J=6.0 Hz, 1H, ArH), 7.65-7.73 (m, 2H, ArH), 7.76 (d, J=2.0 Hz, 1H, ArH), 7.83 (d, J=8.5 Hz, 1H, ArH), 7.87 (d, J=8.5 Hz, 1H, ArH), 7.95 (dd, J$_1$=7.0 Hz, J$_2$=2.0 Hz, 1H, ArH), 7.99 (d, J=8.5 Hz, 1H, ArH), 8.93 (d, J=8.0 Hz, 1H, ArH), 9.01 (d, J=8.0 Hz, 1H, ArH).

Manufacture of Polarizing Film

Example 1

A composition for a polarizing film is prepared by mixing 100 parts by weight of a polyolefin including polypropylene (PP) and a polypropylene-polyethylene copolymer (PP-PE) in a ratio of 5:5 (weight by weight (w/w)) with 0.5 parts by weight of the dichroic dye according to Synthesis Example 1.

The composition for a polarization film is melted and kneaded at about 230° C. by using a Micro-compounder made by DSM. The melted mixture is put in a sheet-shaped mold and pressed with a high pressure at a high temperature to manufacture a film. The film is 1,000% times elongated in a uniaxial direction (with a tensile tester made by Instron) at 125° C. to manufacture a polarizing film.

Example 2

A polarizing film is manufactured according to the same method as Example 1, except for using the dichroic dye of Synthesis Example 2 instead of the dichroic dye of Synthesis Example 1.

Example 3

A polarizing film is manufactured according to the same method as Example 1, except for using the dichroic dye of Synthesis Example 3 instead of the dichroic dye of Synthesis Example 1.

Chemical Formula 1-4

Comparative Example 1

A polarizing film is manufactured according to the same method as Example 1, except for using the dichroic dye of Comparative Synthesis Example 1 instead of the dichroic dye of Synthesis Example 1.

The maximum absorption wavelength ($\Delta_{max}$) and dichroic ratio of the polarizing films of Examples 1 to 3 and Comparative Example 1 in a visible ray region are evaluated. In addition, the aspect ratios of the dichroic dyes used in Examples 1 to 3 and Comparative Example 1 and the solubility parameter differences of the dichroic dyes with a polyolefin are measured and compiled in the following Table 1. The aspect ratios are measured by using a Material Studio program. The solubility parameter is a Hildebrand solubility parameter, which may be calculated according to the following Equation 2.

$$\delta = (CED)^{0.5} = (\Sigma Ecoh_i / \Sigma Vm_i)^{0.5}$$ Equation 2

In Equation 2,
$\delta$ is a solubility parameter,
CED is cohesion energy density,
$Ecoh_i$ is cohesion energy of a functional group i in a molecule, and
$Vm_i$ is a mole volume.

The Hildebrand solubility parameter may be calculated through group contribution of a molecule. Herein, cohesion energy (Ecoh) used to calculate the solubility parameter of a dichroic dye and group contribution of a mole volume ($V_m$) may use well-known values (Reference: *Polym. Eng. Sci.* 1974, 14, 147; *J. Appl. Polym. Sci.* 2005, 96, 416.).

TABLE 1

|  | $\lambda_{max}$ (nm) | dichroic ratio (DR) | Aspect ratio | Solubility parameter difference between polyolefin and dichroic dye |
|---|---|---|---|---|
| Example 1 | 605 | 4.0 | 2.75 | 7.5 |
| Example 2 | 606 | 4.2 | 2.77 | 7.5 |
| Example 3 | 615 | 4.0 | 2.78 | 7.9 |
| Comparative Example 1 | 595 | 2.8 | 2.20 | 5.9 |

The dichroic ratio (DR) is obtained according to the following Equation 1. Equation 1

$$DR = \text{Log}(1/T_\perp) / \text{Log}(1/T_\parallel)$$

In Equation 1,
DR denotes a dichroic ratio,
$T_\parallel$ is light transmittance of light entering parallel to the transmissive axis of a polarizing film, and
$T_\perp$ is light transmittance of light entering perpendicular to the transmissive axis of the polarizing film.

In the Equation 1, the light transmittance is measured by using a V-7100 UV/Vis spectrophotometer made by JASCO Inc. The transmittance is obtained by respectively measuring light transmittance of a polarizing film of light parallel to a transmittance axis of the polarizing film and light transmittance of the polarizing film of light perpendicular to the transmittance axis of the polarizing film with a UV-VIS spectrophotometer (V-7100, JASCO).

Figure 4:
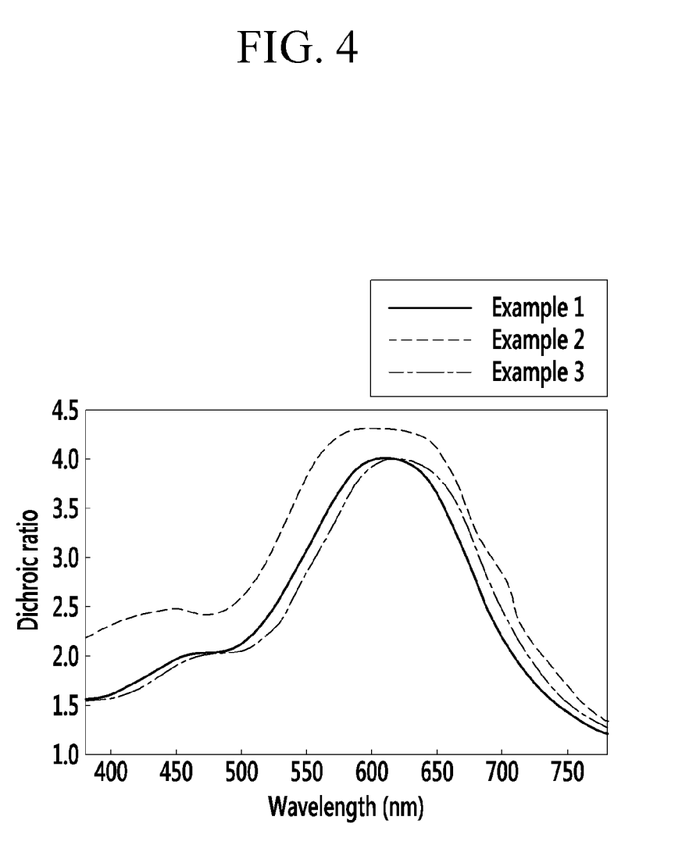
FIG. 4 is a graph of dichroic ratio versus wavelength (nanometers, nm) showing dichroic ratios in a visible ray region of the polarizing films according to Examples 1 to 3.
Figure 5:
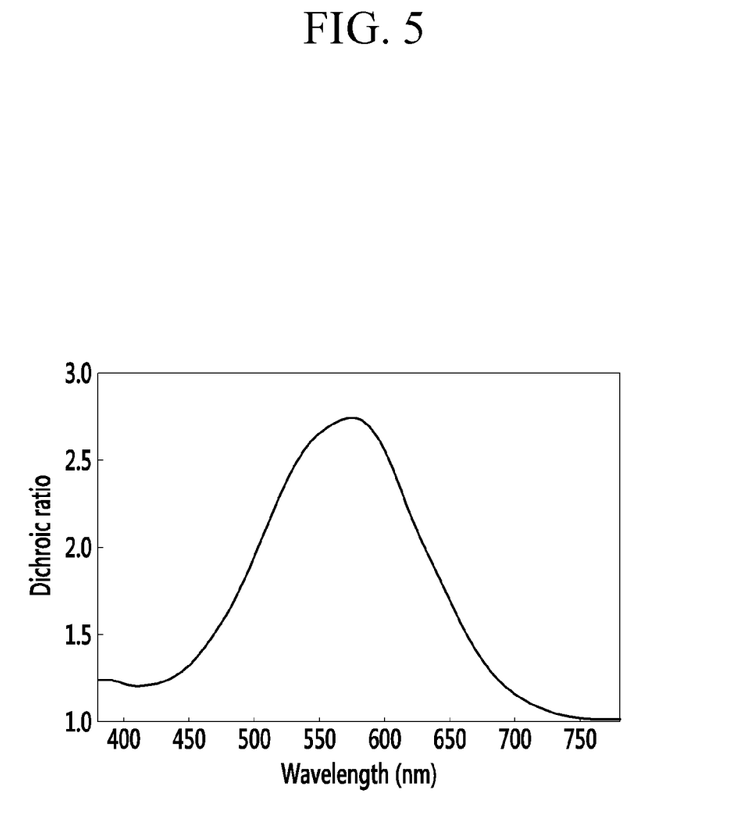
FIG. 5 is a graph of dichroic ratio versus wavelength (nanometers, nm) showing a dichroic ratio in a visible ray region of the polarizing film according to Comparative Example 1.

FIG. 4 is a graph showing dichroic ratios in a visible ray region of the polarizing films according to Examples 1 to 3, and FIG. 5 is a graph showing a dichroic ratio in a visible ray region of the polarizing film according to Comparative Example 1.

In Table 1, the dichroic ratios of the polarizing films according to Examples 1 to 3 and Comparative Example 1 are obtained at a maximum absorption wavelength ($\lambda_{max}$).

Referring to FIGS. 4 and 5 and Table 1, the polarizing films according to Examples 1 to 3 show a high dichroic ratio of greater than or equal to 4.0 in a wavelength region of greater than or equal to 600 nm compared with the polarizing film of Comparative Example 1.

While this disclosure has been described in connection with what is presently considered to be practical exemplary embodiments, it is to be understood that the present inventive concept is not limited to the disclosed embodiments, but, on the contrary, is intended to cover various modifications and equivalent arrangements included within the spirit and scope of the appended claims.

What is claimed is:
1. A polarizing film comprising:
a melt-elongated film comprising
a polyolefin and
a dichroic dye represented by Chemical Formula 1:

Chemical Formula 1 wherein, in Chemical Formula 1,
X is a substituted or unsubstituted C3 to C20 alkyl group or a substituted or unsubstituted C3 to C20 alkoxy group, which is attached at position 6 or 7 of a terminal naphthalene group,
$R^a$ is a halogen, a substituted or unsubstituted C1 to C5 alkyl group, or a substituted or unsubstituted C1 to C5 alkoxy group,
$R^b$ to $R^d$ are hydrogen, a halogen, a substituted or unsubstituted C1 to C5 alkyl group, or a substituted or unsubstituted C1 to C5 alkoxy group,
p is an integer of 1 to 3,
q, r, and s are each independently an integer of 0 to 3,
$R^1$ and $R^2$ are each independently hydrogen or a substituted or unsubstituted C1 to C10 alkyl group, which are optionally linked to each other to form a ring, and
a first azo group is attached at position 1, 2, or 3 of the terminal naphthalene group.

2. The polarizing film of claim 1, wherein X is a substituted or unsubstituted C8 to C20 alkyl group or a substituted or unsubstituted C8 to C20 alkoxy group.

3. The polarizing film of claim 1, wherein X is attached at position 6 of the terminal naphthalene group, and wherein the first azo group is attached at position 2 of the terminal naphthalene group.

4. The polarizing film of claim 1, wherein X is attached at position 7 of the terminal naphthalene group, and wherein the first azo group is attached at position 3 of the terminal naphthalene group.

5. The polarizing film of claim 1, wherein the dichroic dye has an aspect ratio of about 2.5 to about 5.

6. The polarizing film of claim 1, wherein a solubility parameter difference between the polyolefin and the dichroic dye ranges from about 7.4 to about 10.

7. The polarizing film of claim 1, wherein the dichroic dye has a decomposition temperature of greater than or equal to about 245° C.

8. The polarizing film of claim 1, wherein the polyolefin has a melting point of less than or equal to about 300° C.

9. The polarizing film of claim 1, wherein the polyolefin comprises polyethylene, polypropylene, a copolymer thereof, or a combination thereof.

10. The polarizing film of claim 1, wherein the polyolefin has a melt flow index of about 1 gram per 10 minutes to about 15 grams to 10 minutes.

11. The polarizing film of claim 1, wherein polypropylene has a melt flow index of about 0.1 grams per 10 minutes to about 5 grams per 10 minutes, and
the polyethylene-polypropylene copolymer has a melt flow index of about 5 grams per 10 minutes to 15 grams per 10 minutes.

12. The polarizing film of claim 1, wherein the polyolefin is a mixture of polypropylene and a copolymer of polyethylene and polypropylene, and wherein a content of polyethylene in the copolymer of polyethylene and polypropylene is about 1 to about 50 percent by weight.

13. The polarizing film of claim 12, wherein a weight ratio of polypropylene and the copolymer of polyethylene and polypropylene in the polyolefin is about 1:9 to about 9:1.

14. The polarizing film of claim 1, wherein an amount of the dichroic dye in the polarizing film is about 0.01 to about 5 parts by weight based on 100 parts by weight of the polyolefin.

15. The polarizing film of claim 1, wherein the polarizing film has a dichroic ratio of about 3 to about 10 in a wavelength region of greater than or equal to about 600 nanometers.

16. The polarizing film of claim 1, wherein the dichroic dye is dispersed in the polyolefin, and the polyolefin is elongated in a uniaxial direction by about 400 to about 1,000%.

17. A display device comprising the polarizing film of claim 1.

18. A composition for a polarizing film, comprising:
a polyolefin and
a dichroic dye represented by Chemical Formula 1:

Chemical Formula 1 wherein, in Chemical Formula 1,
X is a substituted or unsubstituted C3 to C20 alkyl group or a substituted or unsubstituted C3 to C20 alkoxy group, which is attached at position 6 or 7 of a terminal naphthalene group,
$R^a$ is a halogen, a substituted or unsubstituted C1 to C5 alkyl group, or a substituted or unsubstituted C1 to C5 alkoxy group,
$R^b$ to $R^d$ are hydrogen, a halogen, a substituted or unsubstituted C1 to C5 alkyl group, or a substituted or unsubstituted C1 to C5 alkoxy group,
p is an integer of 1 to 3,
q, r, and s are each independently an integer of 0 to 3,
$R^1$ and $R^2$ are each independently hydrogen or a substituted or unsubstituted C1 to C10 alkyl group, which are optionally linked to each other to form a ring, and
a first azo group is attached at position 1, 2, or 3 of the terminal naphthalene group.

19. The composition for a polarizing film of claim 18, wherein X is a substituted or unsubstituted C8 to C20 alkyl group or a substituted or unsubstituted C8 to C20 alkoxy group.

20. The composition for a polarizing film of claim 18, wherein X is attached at position 6 of the terminal naphthalene group, and wherein the first azo group is attached at position 2 of the terminal naphthalene group.

21. The composition for a polarizing film of claim 18, wherein X is attached at position 7 of the terminal naphthalene group, and wherein the first azo group is attached at position 3 of the terminal naphthalene group.

22. The composition for a polarizing film of claim 18, wherein the dichroic dye has an aspect ratio of about 2.5 to about 5.

23. The composition for a polarizing film of claim 18, wherein a solubility parameter difference between the polyolefin and the dichroic dye ranges from about 7.4 to about 10.

24. The composition for a polarizing film of claim 18, having a solid content of greater than or equal to about 90 percent by weight.

25. The composition for a polarizing film of claim 18, which does not comprise a solvent.

* * * * *